(12) United States Patent
Wang et al.

(10) Patent No.: US 8,560,519 B2
(45) Date of Patent: Oct. 15, 2013

(54) INDEXING AND SEARCHING EMPLOYING VIRTUAL DOCUMENTS

(75) Inventors: Luming Wang, Bellevue, WA (US); Xiaohong Yang, Sammamish, WA (US); Anton Amirov, Redmond, WA (US); Pablo Barvo, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 12/727,739

(22) Filed: Mar. 19, 2010

(65) Prior Publication Data
US 2011/0231386 A1 Sep. 22, 2011

(51) Int. Cl.
*G06F 17/30* (2006.01)

(52) U.S. Cl.
USPC .......................................... 707/709

(58) Field of Classification Search
USPC ............................ 707/999.005, 709, 711, 715
See application file for complete search history.

(56) References Cited

U.S. PATENT DOCUMENTS

| | | | |
|---|---|---|---|
| 6,233,571 B1 * | 5/2001 | Egger et al. | 707/999.002 |
| 6,397,231 B1 | 5/2002 | Salisbury et al. | |
| 6,799,176 B1 | 9/2004 | Page | |
| 7,191,392 B1 | 3/2007 | Coar | |
| 7,203,673 B2 * | 4/2007 | Tsuda | 707/999.003 |
| 7,461,334 B1 * | 12/2008 | Lu et al. | 715/234 |
| 7,490,092 B2 | 2/2009 | Sibley et al. | |
| 2003/0167163 A1 | 9/2003 | Glover et al. | |
| 2003/0225722 A1 | 12/2003 | Brown et al. | |
| 2006/0242564 A1 * | 10/2006 | Egger et al. | 715/513 |
| 2006/0287971 A1 | 12/2006 | Armstrong | |
| 2007/0271268 A1 | 11/2007 | Fontoura et al. | |
| 2008/0114753 A1 * | 5/2008 | Tal-Ezer | 707/5 |
| 2008/0235210 A1 | 9/2008 | Krishnaprasad et al. | |

OTHER PUBLICATIONS

Hewagamage, et al., "Shallow Copying of Multimedia Sources for Virtual Documents", IEEE International Conference on Multimedia and Expo, Aug. 22-25, 2001, Retrieved at << http://ieeexplore.ieee.org/stamp/stamp.jsp?tp=&arnumber=1237910&isnumber=27769 >>, pp. 133-136.

"Managing Compound Document Relationships", Aug. 2009, Retrieved at << http://publib.boulder.ibm.com/infocenter/cmgmt/v8r4m0/index.jsp?topic=/com.ibm.administeringddm.doc/ddmqr034.htm >>, pp. 3.

Myaeng, et al., "Virtual Documents: a New Architecture for Knowledge Management in Digital Libraries", Jan. 29, 2010, Retrieved at << http://winslab.cnu.ac.kr/ Resource/ publication/Virtual%20 Document%20-% 20a%20New%20 Architecture%20for%20Knowledge% 20Management%20in%20 Digital%20Libraries.pdf >>, pp. 13.

"International Search Report", Mailed Date: Oct. 26, 2011, Application No. PCT/US2011/028651, Filed Date: Mar. 16, 2011, pp. 7.

* cited by examiner

Primary Examiner — Yuk Ting Choi
(74) Attorney, Agent, or Firm — Turk IP Law, LLC (57) ABSTRACT

Relationships between linked and/or embedded documents as well as documents sharing data source(s) are captured and rendered through virtual documents. Virtual documents are created representing linked/embedded documents and data sources associated with a relevant document. Relationships between real and virtual documents are preserved and rendered along with search results providing a user a comprehensive picture of search results.

20 Claims, 8 Drawing Sheets

INDEXING AND SEARCHING EMPLOYING VIRTUAL DOCUMENTS

BACKGROUND

Search engines discover and store information about documents such as web pages, which they typically retrieve from the code of the documents. The documents are sometimes retrieved by a crawler or an automated browser, which may follow links in a document or on a website. Conventional crawlers typically analyze documents as flat text files examining words and their positions (e.g. titles, headings, or special fields). Data about analyzed documents may be stored in an index database for use in later queries. A query may include a single word or a combination of words.

Many documents include graphical, video, audio, and similar elements in addition to textual data. Links between documents (e.g. hyperlinks to other documents) are also a common occurrence. Furthermore, documents such as word processing documents or spreadsheets may contain externally sourced data that may be shared between multiple documents. Moreover, embedding whole documents in other documents is also regularly used.

Flat text based searches may not necessarily capture multi dimensional relationships among documents and between documents and data sources such as those described above. To capture relationships between linked/embedded documents or documents and data sources, multiple searches may have to be performed increasing use of system resources and/or losing relationship information in the rendering of the search results.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to capturing and rendering relationships between linked and/or embedded documents as well as documents sharing data source(s) through virtual documents. According to some embodiments, virtual documents may be created representing linked/embedded documents and data sources associated with a relevant document. Relationships between real and virtual documents may be preserved and rendered as a map along with search results providing a user a comprehensive picture of search results.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, relationships between linked/embedded/externally sourced documents may be captured at crawl time by employing virtual documents and rendered to a user along with search results. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may include searches. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
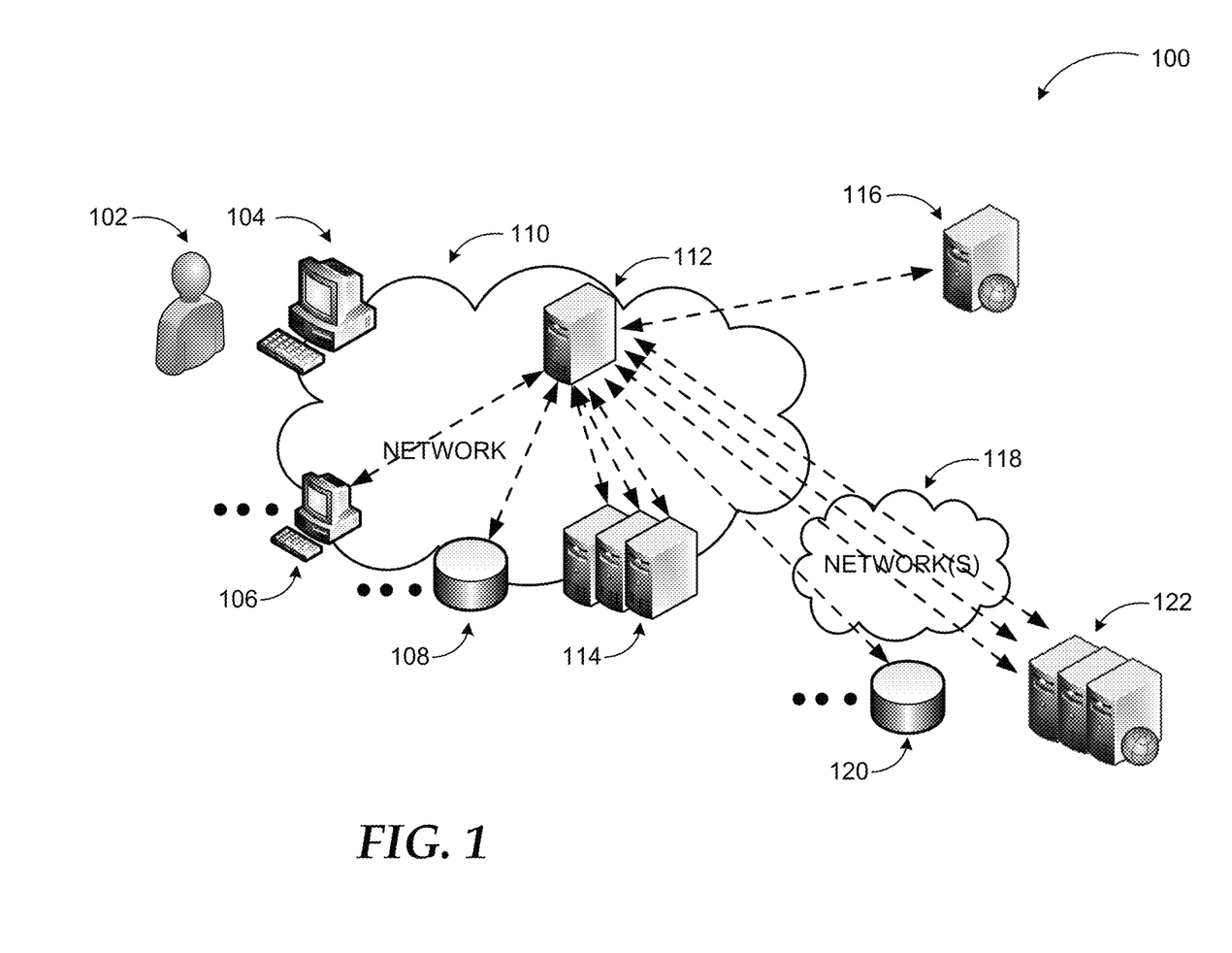
FIG. 1 is a conceptual diagram illustrating virtual document based search operations in a networked search environment.

Referring to FIG. 1, conceptual diagram 100 illustrates virtual document based search operations in a networked search environment. One measure for the quality of a search engine is finding relevant documents as quickly as possible without over-consuming system resources.

When a user submits a query to a search engine (e.g. by using key words), the search engine may examine its index and provide a listing of matching results according to predefined criteria. The index may be built from the information stored with the data and the method by which the information is indexed. The query may include parameters such as Boolean operators (e.g. AND, OR, NOT, etc.) that allow the user to refine and extend the terms of the search. However, conventional search engines typically search textual data within documents and do not detect links to other documents, embedded documents, or shared data sources associated with found documents.

A search engine according to embodiments may capture relationships between linked/embedded/externally sourced documents for subsequent rendering to a requesting user and take the relationships into account in ranking the documents accordingly employing virtual documents representing linked or embedded documents as well as external data sources.

Search operations may be performed in different environments such as on a desktop or in a networked environment as the one shown in diagram 100. The networked search environment shown in diagram 100 is for illustration purposes. Embodiments may be implemented in various networked environments such as enterprise-based networks, cloud-based networks, and combinations of those. User 102 may execute a number of applications in their computing device 104. Some of the applications may be executed locally, while other may be distributed applications executed on other computing devices and accessed through computing device 104.

In a typical system computing device 104 may communicate with one or more servers (e.g., server 112) as a client. Server 112 may execute search operations for user 102 searching documents on server 112 itself, other clients 106, data stores 108, other servers of network 114, or resources outside network 110.

In an example scenario, network 110 may represent an enterprise network, where user 102 may submit a search request. Based on the provided search terms, the search application on server 112 may execute a search capturing relationships between linked/embedded/externally sourced documents at crawl time. The relationships may be preserved for rendering to user 102 as well as taken into consideration for ranking search results. The search may also include resources outside network 110 such as server 116 or servers 122 and data stores 120, which may be accessed through at least one other network 118.

As mentioned above, the search may also be executed on an application residing on the computing device 104 or a distributed service to which user 102 has access through computing device 104 and network 110. Search results may be rendered by the application performing the search (e.g. a browsing application) or provided by the search engine to a variety of applications to be rendered.

Figure 2:
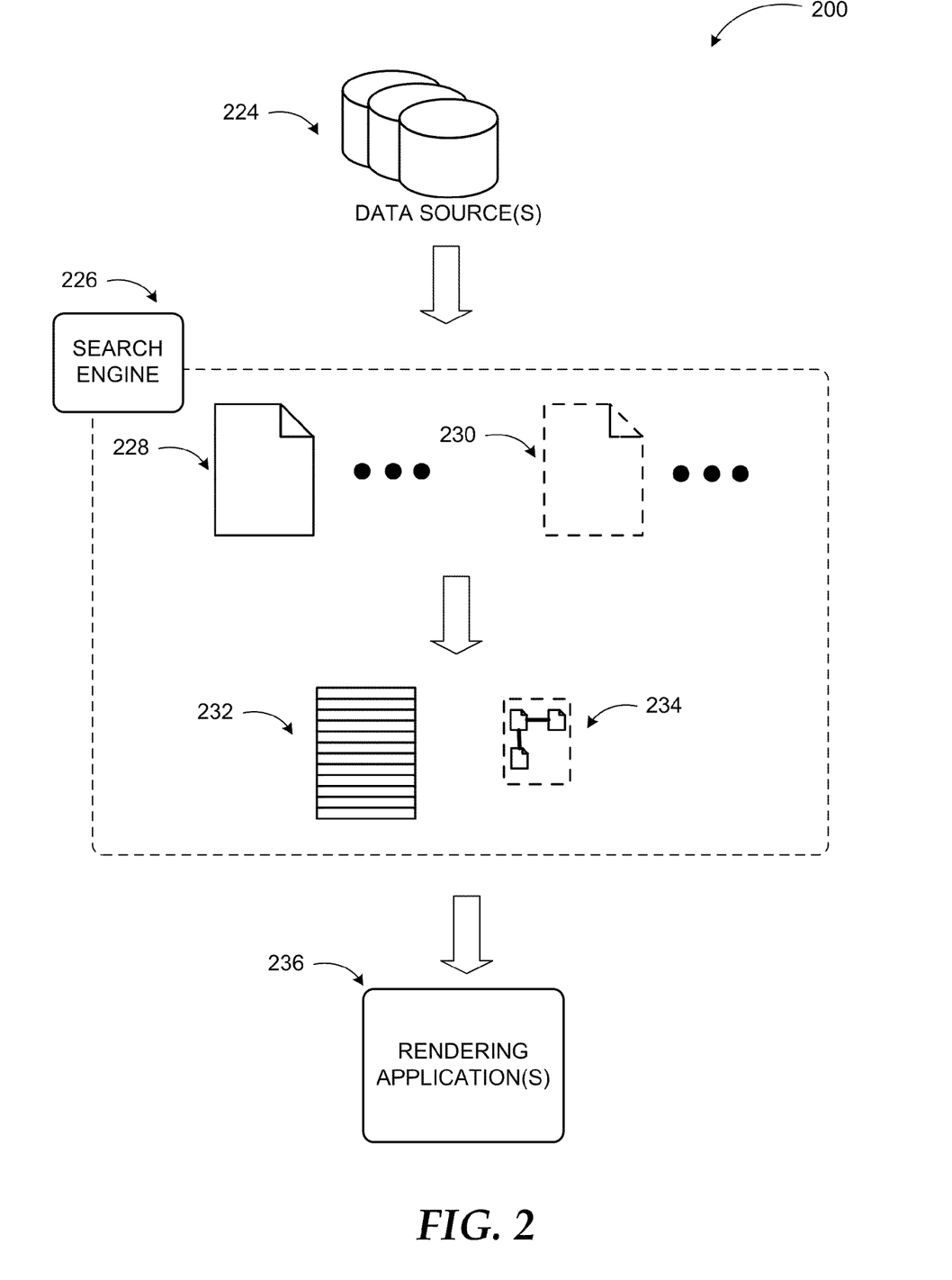
FIG. 2 is a conceptual diagram illustrating search operations employing virtual documents to capture relationships between linked/embedded/externally sourced documents.

FIG. 2 includes conceptual diagram 200 illustrating search operations employing virtual documents to capture relationships between linked/embedded/externally sourced documents. As discussed above, content of searched documents may contain other documents (e.g. a word processing file embedded inside a spreadsheet file), have a linked data relationship with another document (e.g. a spreadsheet cell references to another cell in a different spreadsheet file), or receive data from external data sources, which may also provide data to other documents. During a flat text search these relationships between a document and its embedded documents/dependent documents/external data sources is typically lost. As a result, users may not be able to determine which (how many) documents use a particular data source, may not find data dependency between documents, and may have to repeat the search for any related document/data source over-consuming system resources.

In a system according to embodiments, search engine 226 may perform a search on data sources 224, which may include databases, analysis services, portals (e.g. web share services), various forms of data, and comparable ones. The search may yield regular documents without any of the relationships mentioned above. The search may also return documents that include links to other documents, embedded documents, and data from external data sources. For distinction purposes, the documents without any of the mentioned relationships or documents that contain a link to another document, an embedded document, or data from an external source are referred to as "real documents" herein.

According to some embodiments, the relationships between linked or embedded documents and documents and external data sources may be linked in a chained fashion, meaning multiple levels of relationships may exist among a plurality of documents. Search engine 226 may create virtual documents 230 for each of the linked document/embedded document/external data source. Search engine 226 may further create an index 232 of discovered real documents 228 and virtual documents 230 ranked according to a predefined algorithm. The ranking algorithm may take into consideration the relationships 234 between the real and virtual documents according to some embodiments.

According to other embodiments, the relationships 234 may be preserved and provided to rendering application(s) 236 such that information about the relationships may be presented to the user in addition to the listed search results using a graphical, textual, or comparable scheme. The relationships 234 may be provided to rendering application(s) 236 as metadata or as part of identifiers of each of the virtual documents as explained in more detail below.

The example systems in FIGS. 1 and 2 have been described with specific servers, client devices, software modules, and interactions. Embodiments are not limited to systems according to these example configurations. Indexing and searching by employing virtual documents may be implemented in configurations employing fewer or additional components and performing other tasks. Furthermore, specific protocols and/or interfaces may be implemented in a similar manner using the principles described herein.

Figure 3:
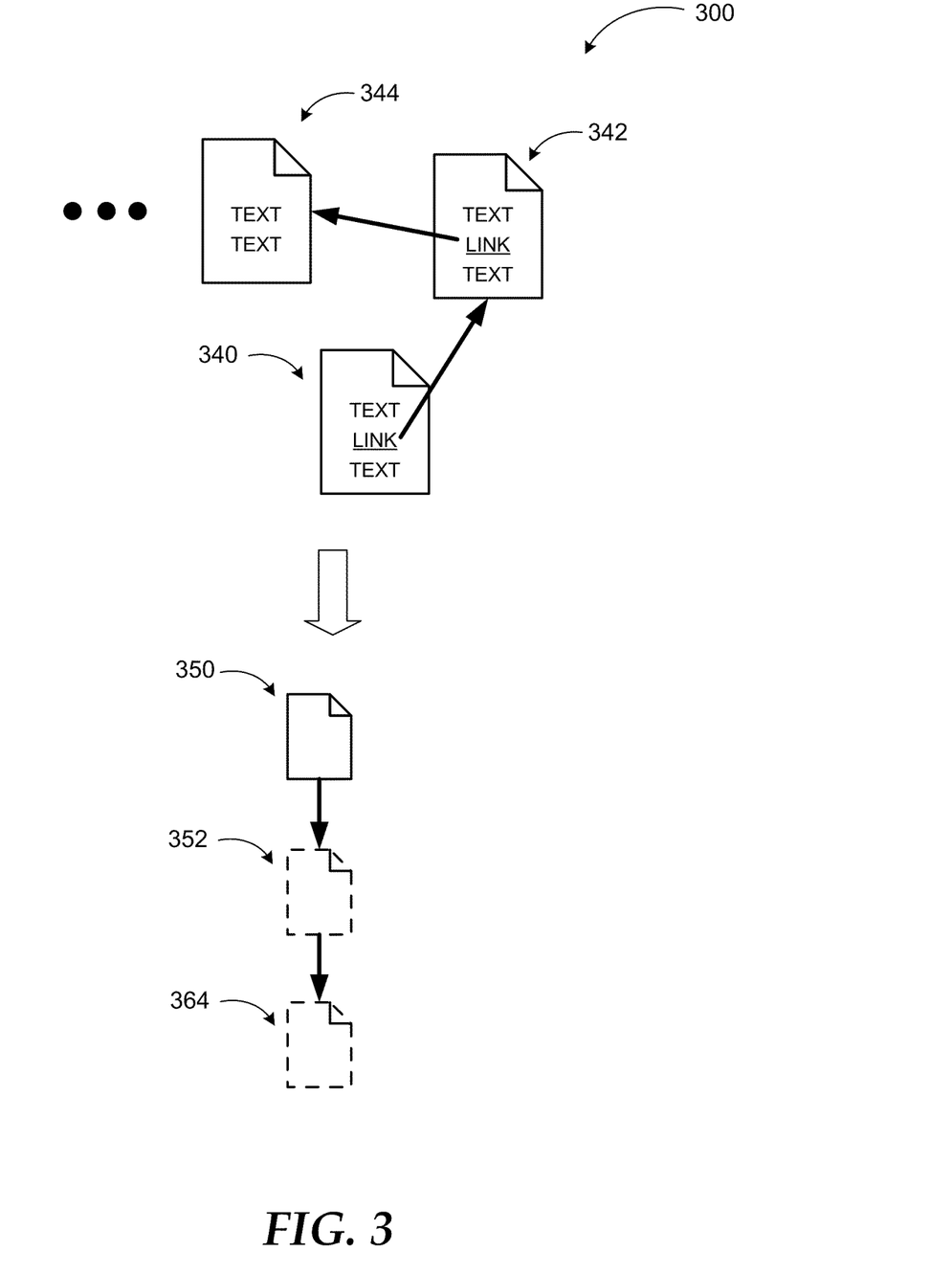
FIG. 3 illustrates capture of relationships between linked documents through virtual documents in a system according to some embodiments.

FIG. 3 illustrates capture of relationships between linked documents through virtual documents in a system according to some embodiments. Diagram 300 shows example document 340, which includes a link to document 342, which in turn includes a link to document 344. Documents 342 and 344 may not be discovered by a conventional search. A search engine according to embodiments may return document 340 as search real document 350 and documents 342 and 344 as virtual documents 352 and 354.

The data dependency relationships between the documents may be preserved in the identifiers of the documents according to one embodiment. For example, the Uniform Resource Locator (URL) identifying virtual document 352 may be a combination of documents 340 and 342 indicating the data dependency between the two documents. Similarly, the URL for virtual document 364 may be a combination of all three documents 340, 342, and 344 indicating the chained relationship between the three documents.

Figure 4:
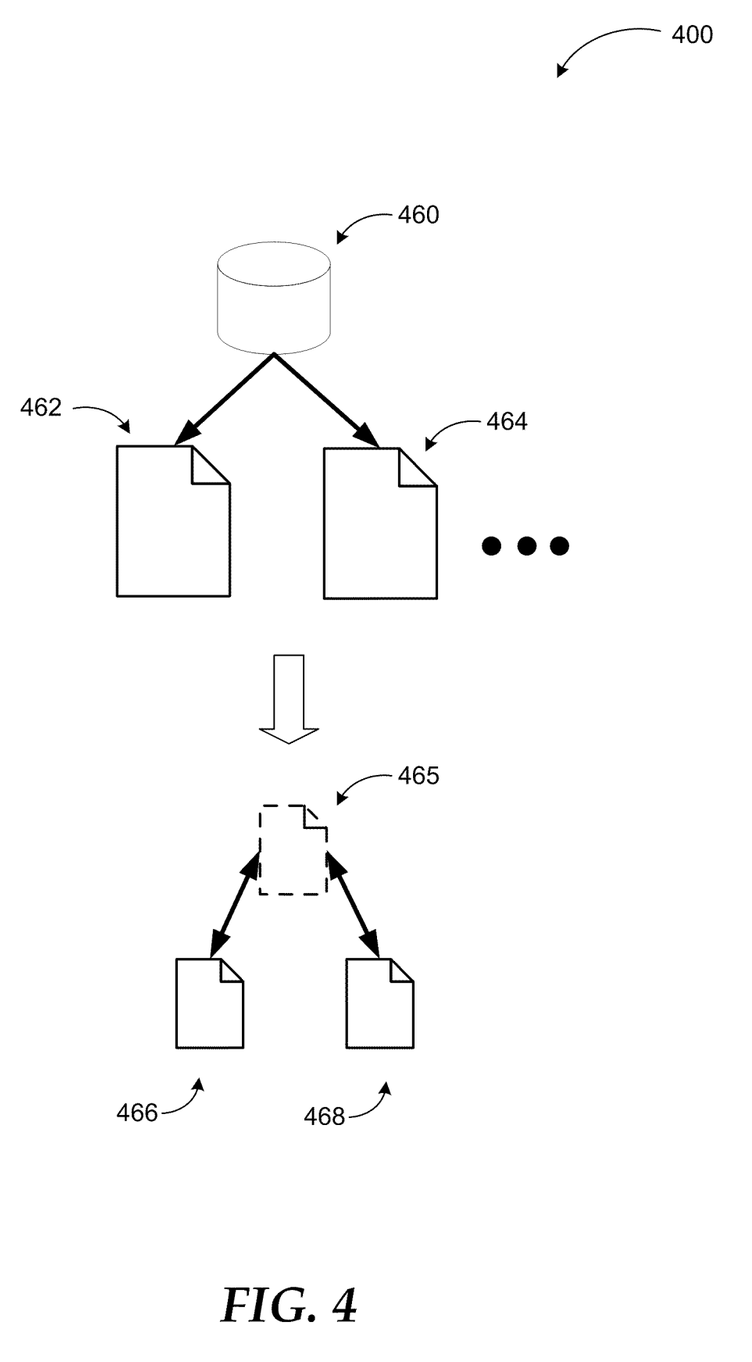
FIG. 4 illustrates capture of relationships between documents sharing a data source through virtual documents in a system according to other embodiments.

FIG. 4 illustrates capture of relationships between documents sharing a data source through virtual documents in a system according to other embodiments. As shown in diagram 400, documents 462 and 464 may contain data dynamically provided from data source 460. For example, documents 462 and 464 may be spreadsheets data include data maintained at data source 460 and updated regularly.

A search engine according to embodiments may determine the relationship between documents 462, 464 and data source 460 and create a virtual document 465 representing data source 460. The relationship between real documents 466, 468 of the search results and virtual document 465 may be preserved in metadata or in the identifiers of real documents 466 and 468 according to one embodiment. For example, the document URLs may be supplemented with a server name and data source identifier of the data source 460 indicating the relationship between the documents and the data source. A rendering application may also determine the fact that both documents 462 and 464 share the same document this way. Embodiments are not limited to two documents or sharing a single data source. Any number of documents sharing any number of data sources may be indexed and results rendered using virtual documents to capture the data dependencies.

Figure 5:
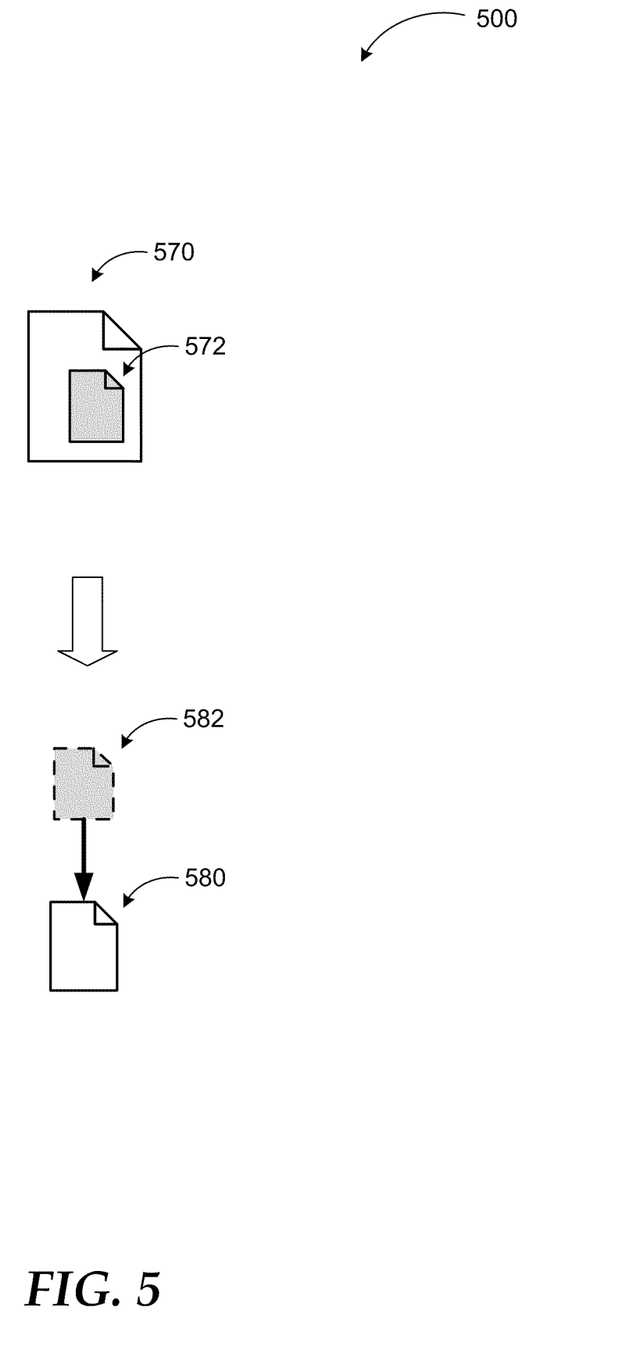
FIG. 5 illustrates capture of relationships between embedded documents through virtual documents in a system according to further embodiments.

FIG. 5 illustrates capture of relationships between embedded documents through virtual documents in a system according to further embodiments. Document 570 in diagram 500 includes embedded document 572, which may not be discovered by a flat text based search engine.

A search engine according to embodiments may create virtual document 582 representing the embedded document 572 in addition to the real document 580 representing document 570 in the search results. As with the above discussed examples, the relationship between the documents may be preserved in metadata or in the identifier of the documents. For example, a URL of the virtual document 582 may include the URL of the parent document (570) and the embedded document's (572) name. Moreover, a type of the embedded document 572 (e.g. word processing, spreadsheet, image, presentation, browsing documents, etc.) may also be preserved as a property of the virtual document.

The example document representations in FIGS. 3, 4, and 5 have been described with specific documents, relationships, and rendering examples. Embodiments are not limited to systems according to these example configurations. Indexing and searching by employing virtual documents may be implemented with other types of documents, relationships, and configurations using the principles described herein.

Figure 6:
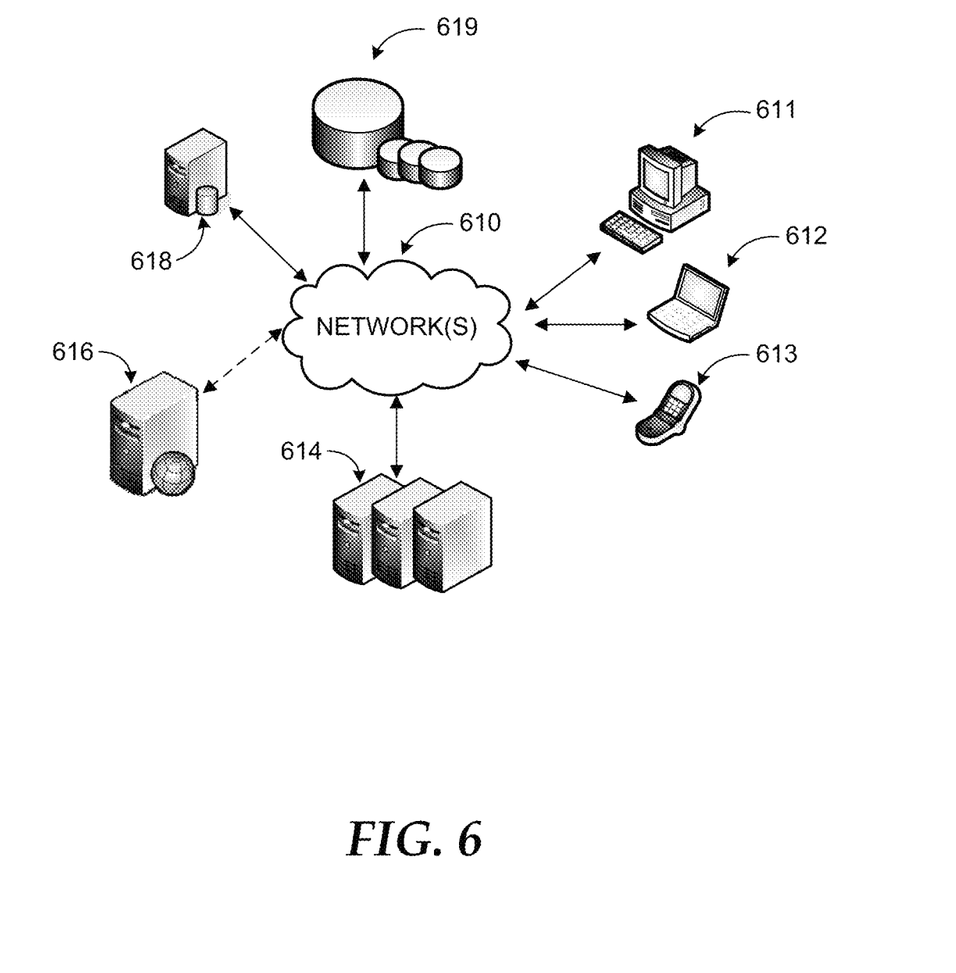
FIG. 6 is a networked environment, where a system according to embodiments may be implemented.

FIG. 6 is an example networked environment, where embodiments may be implemented. A platform providing virtual document based searches for capturing relationships between documents may be implemented via software executed over one or more servers 614 such as a hosted service. The platform may communicate with client applications on individual computing devices such as a smart phone 613, a laptop computer 612, or desktop computer 611 ('client devices') through network(s) 610.

As discussed above, client applications executed on any of the client devices 611-613 may submit a search request to a search engine on the client device 611-613, on the servers 614, or on individual server 616. The search engine may determine related documents such as linked, embedded, or data source sharing ones and preserve the relationships creating virtual documents at crawl time as discussed previously. The search results may also be ranked considering the captured relationships. The service may retrieve relevant data from data store(s) 619 directly or through database server 618, and provide the ranked search results to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a framework for indexing and searching employing virtual documents. Furthermore, the networked environments discussed in FIG. 6 are for illustration purposes only. Embodiments are not limited to the example applications, modules, or processes.

Figure 7:
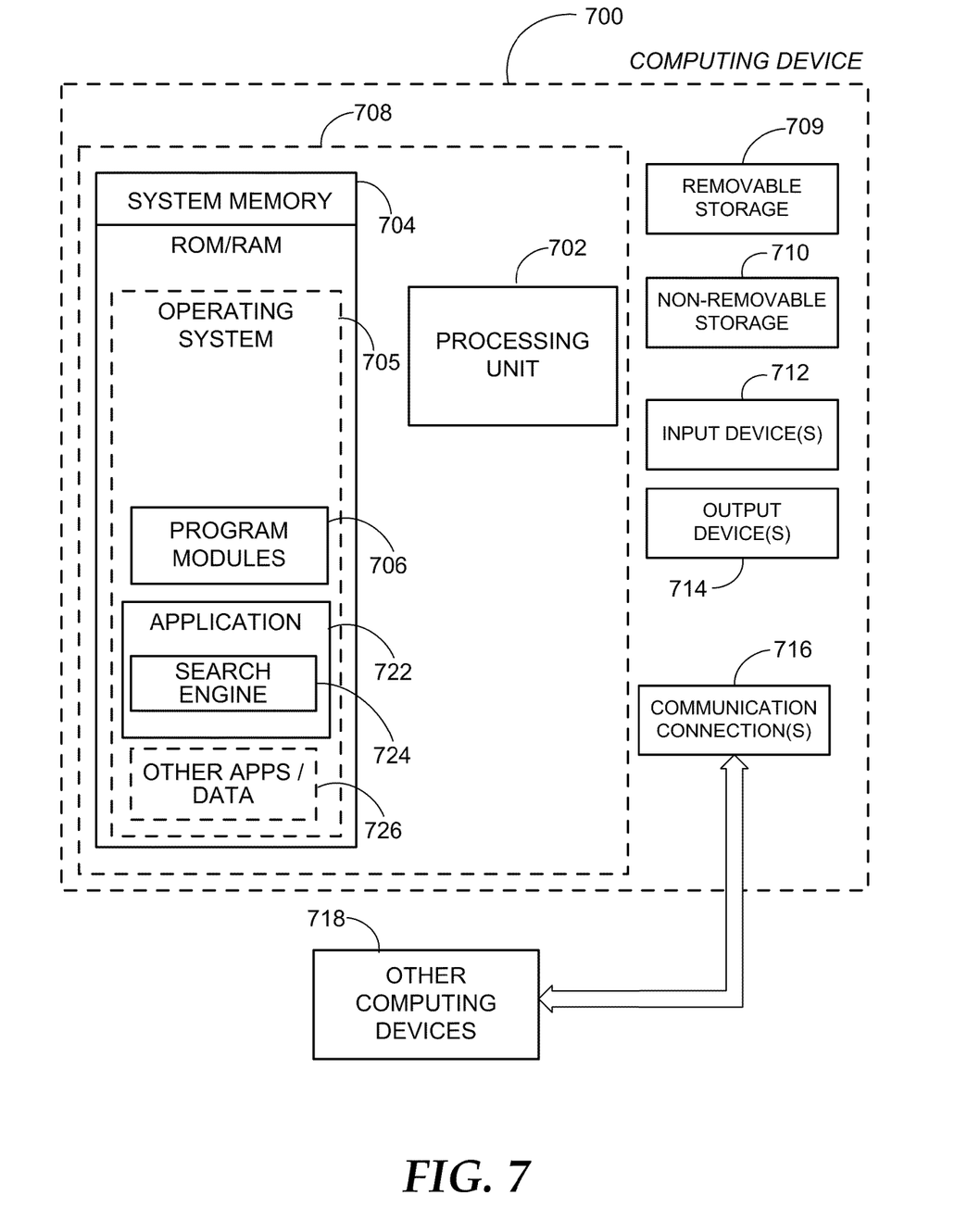
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a client device executing a client application capable of performing searches or a server executing a service capable of performing searches according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, search capable application 722, search engine 724, and optionally other applications/data 726.

Application 722 may be any application that is capable of performing search through search engine 724 on other applications/data 726 in computing device 700 and/or on various kinds of data available in an enterprise-based or cloud-based networked environment. Search engine 724 may create virtual documents for representing linked, embedded, or data source sharing documents associated with found documents as discussed previously. Application 722 and search engine 724 may be separate applications or an integral component of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, other web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
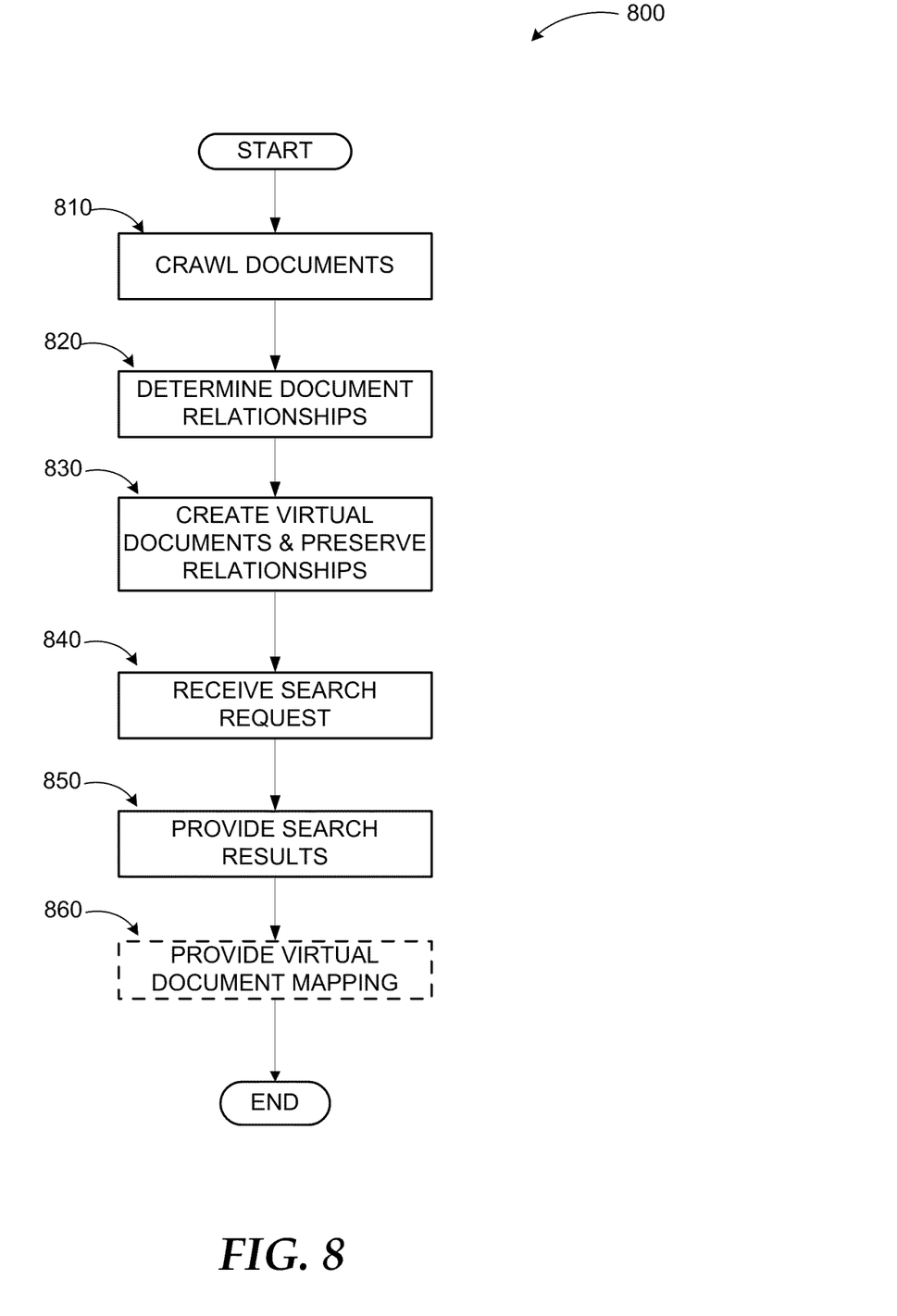
FIG. 8 illustrates a logic flow diagram for a process of performing a search employing virtual documents to capture relationships between linked/embedded/externally sourced documents according to embodiments.

FIG. 8 illustrates a logic flow diagram for process 800 of performing a search employing virtual documents to capture relationships between linked/embedded/externally sourced documents according to embodiments. Process 800 may be implemented as part of an application executed on a server or client device.

Process 800 begins with operation 810, where documents are crawled. Crawl results may be indexed for rapid rendering of search results in subsequent searches. At operation 820, relationships between linked/embedded/externally sourced documents may be determined as the crawl is being executed. The relationships may connect two or more documents as discussed previously. Each virtual document may be uniquely identified such that crawling and indexing of the virtual documents can be performed at once instead of through multiple cycles.

At operation 830, virtual documents may be created to represent the connected documents or data sources such that the relationships can be preserved for subsequent rendering. The relationships may further be used to rank the real and virtual documents. At operation 840, a search request may be received from a user. Search results may be provided to a rendering application at operation 850. Along with the ranked documents, information about the relationships may also be provided, for example, as metadata or as part of the identifiers of the virtual documents. Thus, virtual documents are independently crawled and indexed in a system according to embodiments. The relationships between documents and associated virtual documents may be stored as a property of both the real document and the associated document rendering those searchable and navigable. At optional operation 860, the relationships may be rendered as document mapping in a variety of formats.

The operations included in process 800 are for illustration purposes. Indexing and searching using virtual documents for capturing relationships between linked, embedded, and data source sharing documents may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for performing searches employing virtual documents, the method comprising:
receiving a search request from a user for retrieving one or more documents matching criteria provided in the search request;
at crawl time, identifying the one or more documents matching the criteria;
identifying a relevant first document included within the one or more documents matching the criteria;
identifying a second document embedded within the relevant first document, a link to the second document included within the relevant first document, a link to a third document included within the second document and a data source providing data to the relevant first document at crawl time such that the relevant first document and the data source is indexed in a single search;
determining a relationship between the relevant first document and the second document, and between the second document and the third document;
creating a virtual document representing the second document, the third document and the data source;
uniquely identifying the virtual document to index the virtual document and to crawl through the virtual document in one cycle instead of multiple cycles;

creating an index of search results including the relevant first document and the virtual document representing the second document, the third document and the data source;
ranking the search results in the index according to a predefined algorithm; and
providing the search results to a client application for presenting the search results and relationships between the relevant first document and the virtual document, wherein the search results are ranked taking into consideration the relationships between the relevant first document and the virtual document; and rending the relationships as a document mapping in a plurality of formats.

2. The method of claim 1, wherein the relationship between the relevant first document and the second document includes one of: the second document being linked from the relevant first document and the second document being embedded into the relevant first document, and further includes one of: the third document being linked from the second document and the third document being embedded into the second document.

3. The method of claim 2, further comprising:
creating another virtual document representing an external data source linked to the relevant first document; and
including the other virtual document in indexing the search results.

4. The method of claim 3, further comprising:
rendering a relationship between at least one of: the relevant first document and the second document, and the relevant first document and the third document employing the virtual document and the other virtual document.

5. The method of claim 3, further comprising:
preserving relationships between the relevant first document and at least one of the second document and the source third document through one of: metadata associated with the search results and identifiers of the virtual document and the other virtual document.

6. The method of claim 5, wherein an identifier for the virtual document includes:
a combination of an identifier for the relevant first document and an identifier for the second document if the documents are linked, and
a combination of the identifier for the relevant first document and a name of the second document if the second document is embedded into the relevant first document.

7. The method of claim 5, wherein an identifier for the other virtual document includes a combination of a server name and an external data source identifier.

8. The method of claim 1, wherein the relevant first document is related to a plurality of documents, and the method further comprises:
creating a plurality of virtual documents each representing one of the plurality of documents.

9. The method of claim 1, wherein the search is performed in one of a desktop environment and a networked environment.

10. The method of claim 1, wherein the relevant first document content includes at least one from a set of: textual data and graphical data.

11. A networked computing device facilitating searches employing virtual documents, the computing device comprising:
a memory storing instructions;
a processor coupled to the memory, the processor executing a search application based on the stored instructions, wherein the search application is configured to:
receive a search request; at crawl time, identify one or more documents matching criteria provided in the search request;
determine a document linked to a relevant document, a document embedded into the relevant document, another document embedded in the document linked to the relevant document, and a data source providing data to the relevant document;
create virtual documents representing each of the linked document, the embedded document, the other embedded document, and the data source;
uniquely identify the virtual documents to index the virtual documents and to crawl through the virtual documents in one cycle instead of multiple cycles;
create an index of search results including the relevant document and the virtual documents representing: the linked document, the embedded document, the other embedded document, and the data source;
rank the search results in the index according to a predefined algorithm;
provide the search results to a client application for rendering, wherein the search results are ranked taking into consideration relationships between the relevant document and the virtual documents; and render the relationships as a document mapping in a plurality of formats.

12. The computing device of claim 11, wherein the search application is further configured to:
provide information associated with the relationships between the relevant document and the virtual documents to the client application enabling the client application to render the relationships along with the search results.

13. The computing device of claim 12, wherein the relationships are rendered employing at least one of a graphical scheme and a textual scheme.

14. The computing device of claim 11, wherein the relationships include one of: a plurality of linked documents, a plurality of embedded documents, and a plurality of linked data sources in a chained fashion, and wherein identifiers of the virtual documents are composed to reflect the chained relationships.

15. The computing device of claim 14, wherein a Uniform Resource Locator (URL) for a virtual document representing a document linked to the relevant document includes a combination of the URLs for the relevant document and the linked document, a URL for a virtual document representing a document embedded into the relevant document includes a combination of the URL for the relevant document and a name of the embedded document, and a URL for a virtual document representing a data source linked to the relevant document includes a combination of a server name associated with the data source and a data source identifier.

16. The computing device of claim 11, wherein the search is performed on at least one from a set of: a database source, an analysis service, a portal, another server, and a desktop.

17. The computing device of claim 11, wherein the computing device is coupled to one of: an enterprise-based network, a cloud-based network, and a combination of an enterprise-based network and a cloud-based network.

18. A computing device for facilitating searches employing virtual documents, the computing device comprising:
a processor configured to execute a search application based on stored instructions; and
a memory coupled to the processor, wherein the memory is configured to store the instructions, the instructions comprising:

receiving a search request at a search application; and at crawl time, identifying one or more documents matching criteria provided in the search request;

determining a document linked to a relevant document, a document embedded into the relevant document, another document embedded in the document embedded into the relevant document, and a data source providing data to the relevant document at crawl time such that the relevant document and related documents and data sources are indexed in a single search;

creating virtual documents representing each of the linked document, the embedded document and the data source such that the linked document, the embedded document, the other embedded document, and the data source are rendered searchable and navigable;

uniquely identifying the virtual documents to index the virtual documents and to crawl through the virtual documents in one cycle instead of multiple cycles;

creating an index of search results including the relevant document and the virtual documents representing: the linked document, the embedded document, the other embedded document, and the data source;

ranking the search results in the index according to a predefined algorithm;

providing the search results to a client application for presenting the search results and relationships between the relevant document and the virtual documents, wherein the search results are ranked taking into consideration the relationships between the relevant document and the virtual documents; and rendering the relationships as a document mapping in a plurality of formats.

19. The computing device of claim 18, wherein the virtual document representing the data source enables the search application to infer relationships between the relevant document and a plurality of documents sharing the same data source.

20. The computing device of claim 18, wherein a type of the document embedded into the relevant document and the other embedded document is stored as a property of the virtual document representing the embedded document.

* * * * *